United States Patent
Tinklepaugh

(10) Patent No.: US 12,299,829 B2
(45) Date of Patent: May 13, 2025

(54) TEMPLATE FOR GENERATING THREE-DIMENSIONAL REPRESENTATION OF DATA FOR USE IN THREE-DIMENSIONAL ENVIRONMENT

(71) Applicant: Truist Bank, Charlotte, NC (US)

(72) Inventor: Micah Ryan Tinklepaugh, Charlotte, NC (US)

(73) Assignee: TRUIST BANK, Charlotte, NC (US)

( * ) Notice: Subject to any disclaimer, the term of this patent is extended or adjusted under 35 U.S.C. 154(b) by 176 days.

(21) Appl. No.: 18/150,448

(22) Filed: Jan. 5, 2023

(65) Prior Publication Data

US 2024/0233281 A1    Jul. 11, 2024

(51) Int. Cl.
| | |
|---|---|
| *G06T 19/00* | (2011.01) |
| *G06Q 40/06* | (2012.01) |
| *G06F 3/04842* | (2022.01) |

(52) U.S. Cl.
CPC .......... *G06T 19/006* (2013.01); *G06Q 40/06* (2013.01); *G06F 3/04842* (2013.01); *G06T 2200/24* (2013.01)

(58) Field of Classification Search
None
See application file for complete search history.

(56) References Cited

U.S. PATENT DOCUMENTS

| 9,047,705 B1 * | 6/2015 | Ko .......................... G06Q 40/00 |
| 2010/0057618 A1 * | 3/2010 | Spicer ................. G06F 3/04815 |
| | | 715/848 |
| 2018/0060606 A1 * | 3/2018 | Dascola .............. G06F 21/6245 |

* cited by examiner

*Primary Examiner* — Saptarshi Mazumder
(74) *Attorney, Agent, or Firm* — Michael A. Springs, Esq.; Shumaker, Loop & Kendrick, LLP; Patrick B. Horne

(57) ABSTRACT

A system for generating and displaying a three-dimensional representation is configured to provide a template for selection by a user with the template corresponding to a program for generating the three-dimensional representation for display relative to a corresponding three-dimensional environment. The system accesses characteristic data associated with determining at least one variable characteristic of an appearance of the three-dimensional representation and generates the three-dimensional representation. An appearance of the three-dimensional representation includes at least one variable characteristic that is determined by reference to the accessed characteristic data. The three-dimensional representation is then able to be displayed relative to the corresponding three-dimensional environment, which may be virtual (VR) or real-world (AR).

14 Claims, 7 Drawing Sheets

TEMPLATE FOR GENERATING THREE-DIMENSIONAL REPRESENTATION OF DATA FOR USE IN THREE-DIMENSIONAL ENVIRONMENT

FIELD

This invention relates generally to the field of virtual reality and augmented reality, and more particularly, embodiments of the invention relate to virtual reality and augmented reality based methods of completing a transaction via interaction with a 3-D environment or other 3-D graphical representation.

BACKGROUND

It is common for financial institutions to provide dedicated software applications and other online resources to their customers for providing expanded access to financial information and services. For example, it is common for such customers to be able to access account information, transaction histories, informational resources, and financial products while navigating such online resources. Such financial institutions may also participate in a process of assessing the financial competency and/or literacy of such customers. Such assessments may be performed in an attempt to intervene and improve the habits of the customer, such as offering advice on budgeting, investment planning, or potential uses of financial services offered by the financial institution.

It has also become increasingly common for customers of such financial institutions to participate in virtual reality or augmented reality related activities, as such activities have become readily accessible via the introduction of various smart devices and associated components, as well an increase in the availability of devices dedicated to VR and AR related processes. For example, it has become extremely common for AR related elements to be utilized in social media posts in the form of what are traditionally referred to as "filters." Such filters allow for a three-dimensional object or character to be displayed relative to a real-world environment, such as the image taken by a camera of an associated smart device. The use of these filters aids in promoting social media engagement by providing new avenues for the generation of content, as such filters may be utilized as a focus of the content of the social media post. Each new filter may accordingly represent a new opportunity for social media engagement.

As another example, it is common for three-dimensional virtual environments to allow for the introduction of unique three-dimensional content therein, such as utilizing three-dimensional representations of articles of clothing to be displayed as being worn by a character navigating the three-dimensional virtual environment. Such three-dimensional content is able to be displayed to other users of the virtual environment during various social interactions occurring within the virtual environment, thereby allowing for such three-dimensional content to provide another source of engagement within such virtual social environments.

It would accordingly be desirable to produce a method and system for generating unique three-dimensional imagery relating to financial content as may be displayed in a social media post or corresponding social environment, wherein such three-dimensional imagery may be utilized to aid in communicating a financial concept or trend in a manner preferable to traditional data reporting methods.

BRIEF SUMMARY

Embodiments of the present invention address the above needs and/or achieve other advantages by providing apparatuses and methods that generate and display unique three-dimensional imagery associated with the communicating of financial content relative to a three-dimensional environment, whether virtual or actual in form.

In one embodiment, a system for generating and displaying a three-dimensional representation is configured to provide a template for selection by a user with the template corresponding to a program for generating the three-dimensional representation for display relative to a corresponding three-dimensional environment. The system accesses characteristic data associated with determining at least one variable characteristic of an appearance of the three-dimensional representation and then generates the corresponding three-dimensional representation. An appearance of the three-dimensional representation includes at least one variable characteristic that is determined by reference to the accessed characteristic data. The three-dimensional representation is displayed relative to the corresponding three-dimensional environment, which may be virtual (VR) or real-world (AR).

According to embodiments of the invention, a method of generating and displaying a three-dimensional representation includes the steps of providing a template for selection by a user, the template corresponding to a program for generating the three-dimensional representation for display relative to a corresponding three-dimensional environment; accessing characteristic data associated with determining at least one variable characteristic of an appearance of the three-dimensional representation; generating the three-dimensional representation, an appearance of the three-dimensional representation including at least one variable characteristic thereof determined by the accessed characteristic data; and displaying the three-dimensional representation relative to the corresponding three-dimensional environment.

According to further aspects of the present invention, the three-dimensional environment may be a virtual three-dimensional environment or may be a real-world environment.

The accessing of the characteristic data may include prompting the user for an entry of the characteristic data or may include accessing the personal data of the user, which may be stored to a memory device of the system.

The personal data of the user may be financial data. The characteristic data may also be financial data associated with the user.

The characteristic data may be a monetary amount, and the three-dimensional representation may have the appearance of at least one object having a monetary value corresponding to the monetary amount, such as having the appearance of one or more forms of currency having the monetary value corresponding to the monetary amount. The characteristic data may be a monetary amount corresponding to an account balance of the user.

The three-dimensional representation may include a plurality of the objects having a known combined value. The at least one variable characteristic of the appearance of the three-dimensional representation may include a number of the at least one objects utilized in forming the appearance of the three-dimensional representation. The appearance of the three-dimensional representation may be personalized to the user based on the characteristic data. The three-dimensional representation may relate to financial content, including financial advice or financial assessment.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
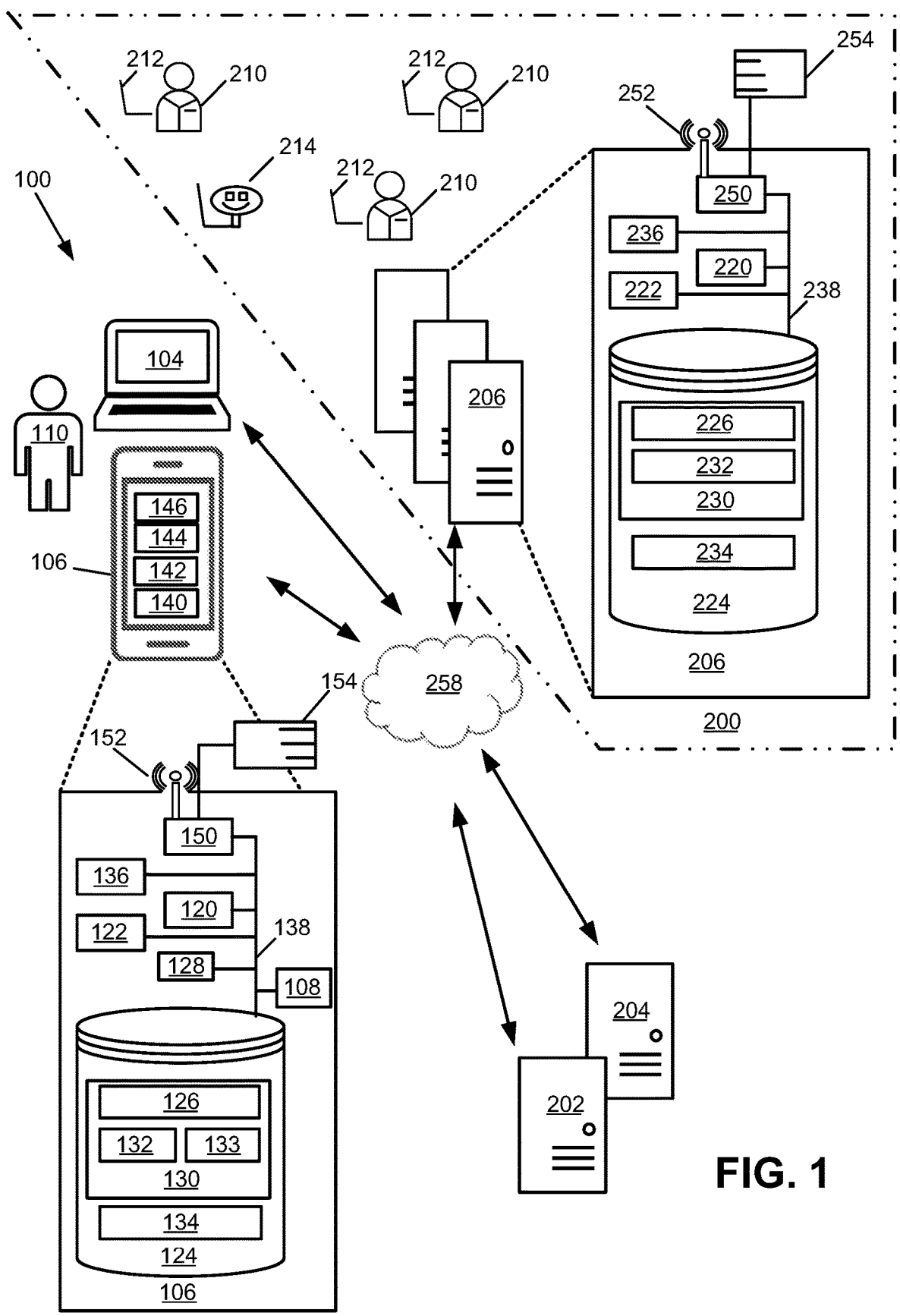

Having thus described embodiments of the invention in general terms, reference will now be made to the accompanying drawings, wherein:

FIG. 1 illustrates an enterprise system and environment thereof for generating a three-dimensional representation of financial information, in accordance with one embodiment of the present invention.

Figure 2A:
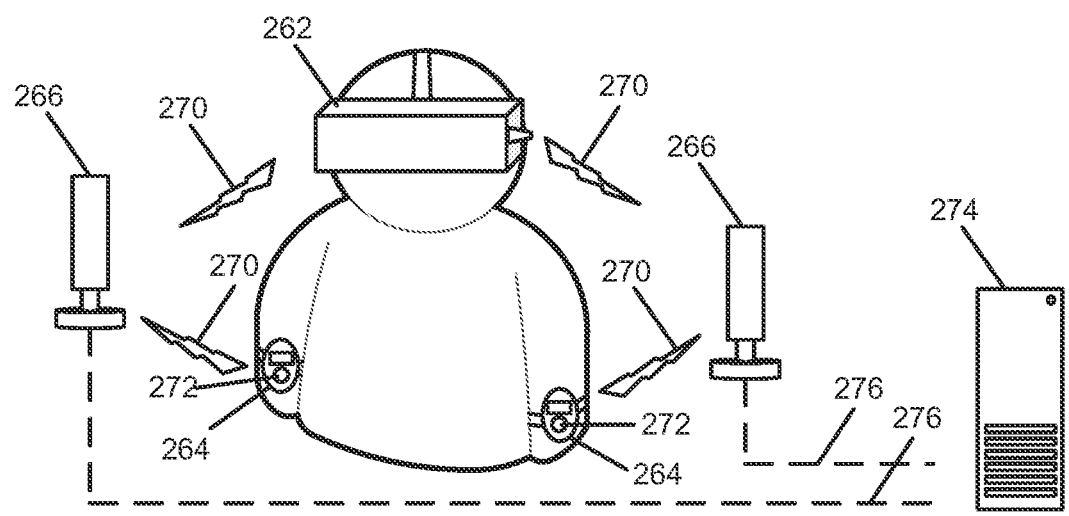

FIG. 2A illustrates equipment items, according to at least one embodiment, used in a virtual reality (VR) session.

Figure 2B:
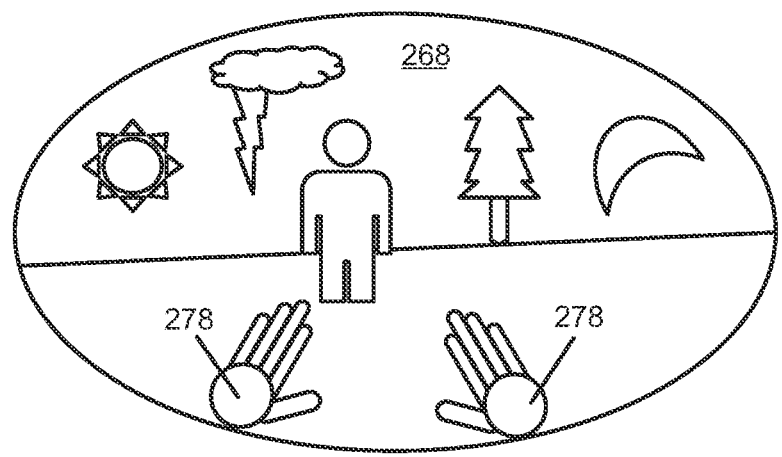

FIG. 2B shows a user view of a simulated environment in a VR session via a helmet or visor.

Figure 3A:
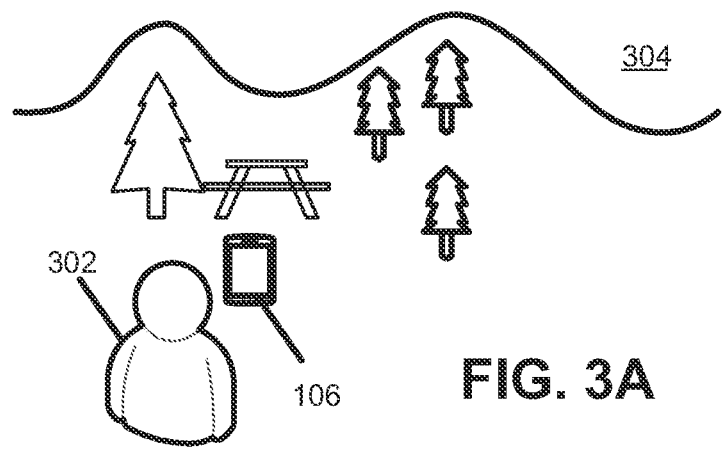

FIG. 3A illustrates an AR session in which a user views a background scene through an AR equipped mobile device.

Figure 3B:
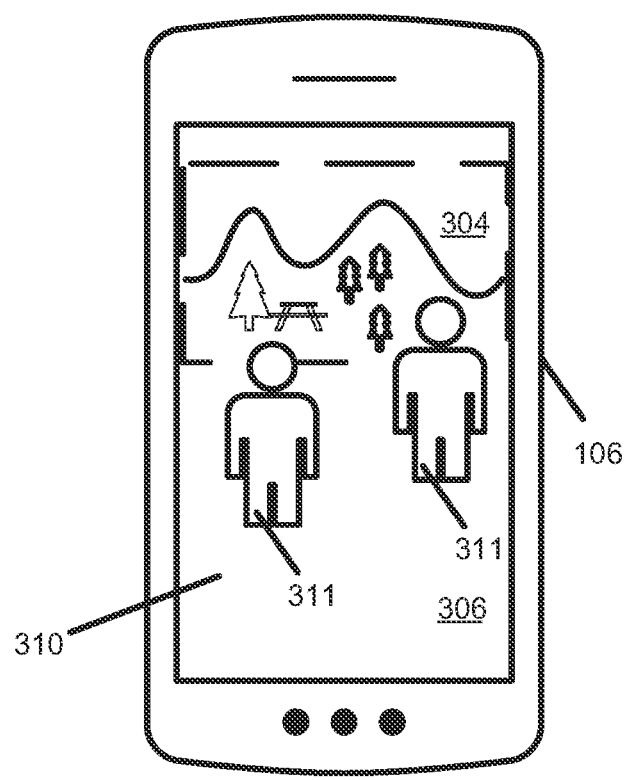

FIG. 3B shows the AR image 306 on the mobile device 106

Figure 4:
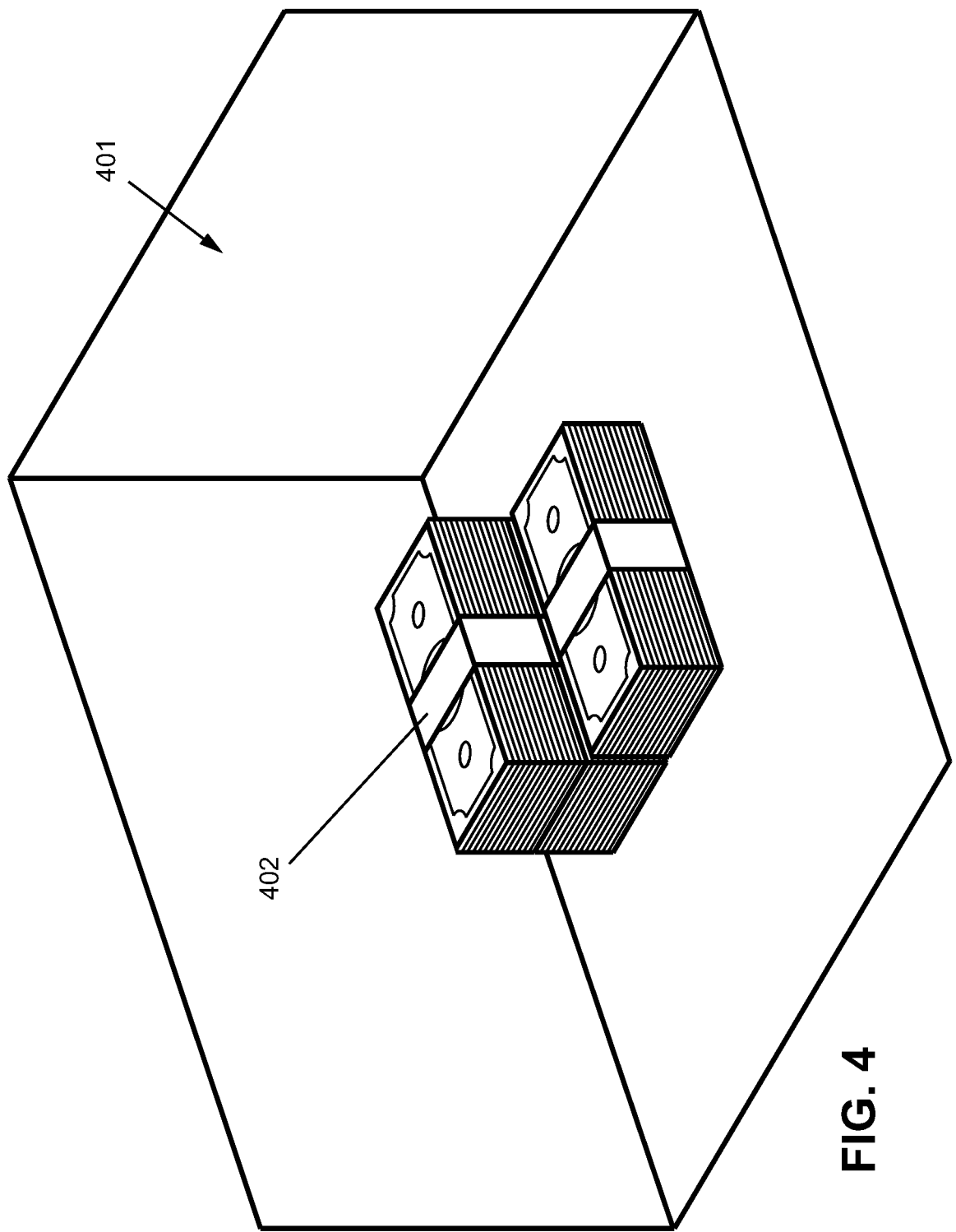

FIG. 4 is a perspective view showing a three-dimensional representation relative to a three-dimensional environment according to a first exemplary embodiment of the present invention.

Figure 5:
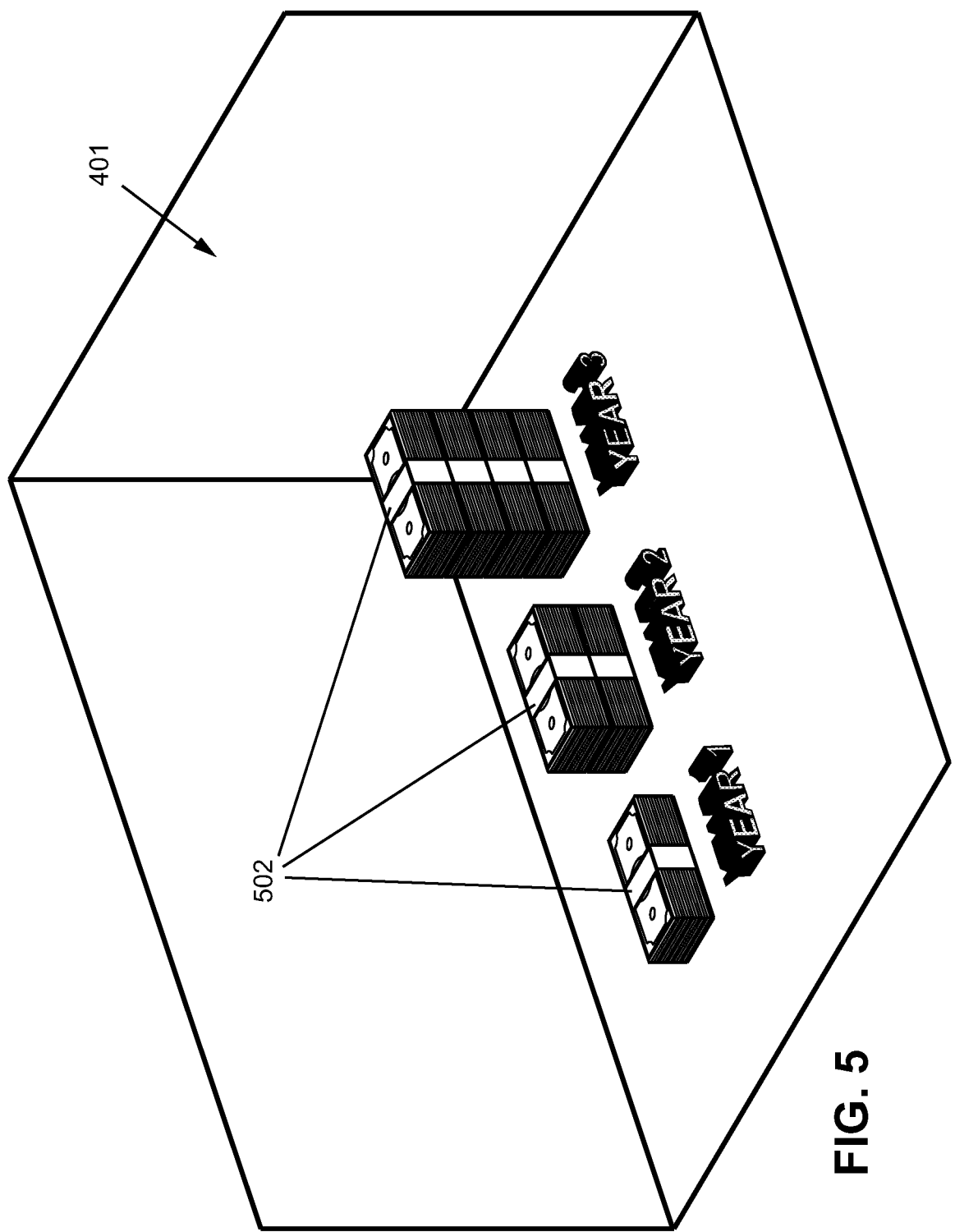

FIG. 5 is a perspective view showing a three-dimensional representation relative to a three-dimensional environment according to a second exemplary embodiment of the present invention.

Figure 6:
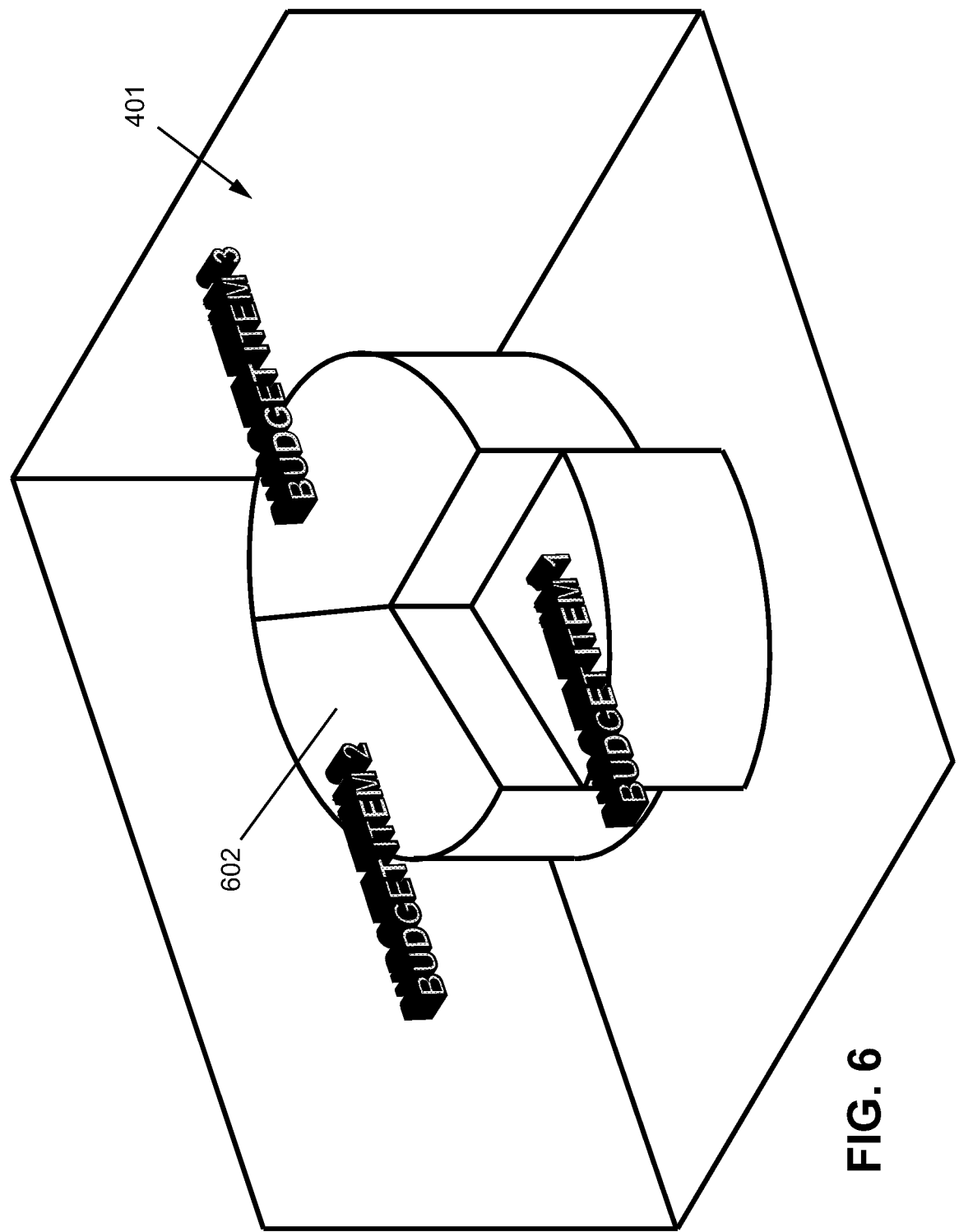

FIG. 6 is a perspective view showing a three-dimensional representation relative to a three-dimensional environment according to a third exemplary embodiment of the present invention.

Figure 7:
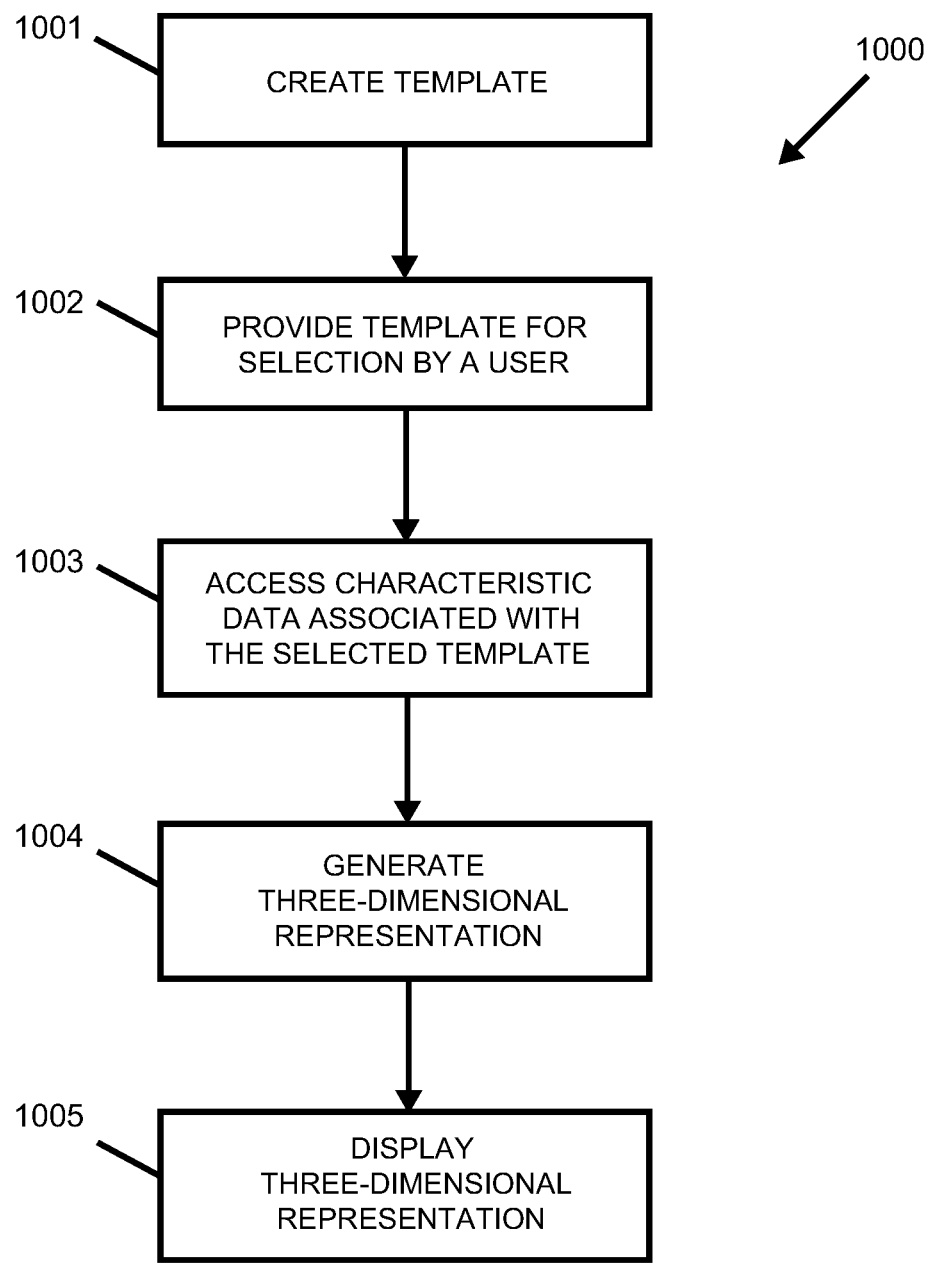

FIG. 7 is a flow chart illustrating a method according to an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the illustrated applications 132, 133 are represented as particular examples. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1. As used hereinafter, it is assumed that references to the enterprise system 200 performing an action related to the collection, transfer, or analysis of data is referring to an action being taken by the appropriate components of the computing system 206 of the enterprise system 200 as described herein. Similarly, references to such actions being performed by the computing devices 104, 106 or the external systems 202, 204 should be assumed to be performed by corresponding components thereof.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed The above-described systems and computing devices, in some embodiments, are used in whole or in part to implement virtual reality (VR) and/or augmented reality (AR) functioning. Virtual reality refers to a computer-generated simulation of a three-dimensional image or environment that can be interacted with in a seemingly real or physical way by a person using special electronic equipment, such as a visor or helmet with an internal screen, and gloves, hand-held controller, and/or other effects fitted with sensors. A VR experience is typically immersive, offering the user a typically entirely artificial computer-generated environment. As vision of the real world around the user is occluded by a visor or helmet, a VR session typically occurs indoors and/or in a safe controlled environment for the safety of the user. VR equipment items are typically interactive devices represented in FIG. 2A as a visor or helmet 262, hand-held or mounted controllers 264, and sensors 266. Connections 270 in FIG. 2A represent interconnectivity among the visor or helmet 262, controllers 264, and sensors 266. The connections 270 may be wireless as represented in FIG. 2A and/or may included wired connections as well.

VR applications immerse the user in a computer-generated environment (FIG. 2B) that simulates reality through the use of the interactive elements. The helmet or visor provides the user with a stereoscopic view 268 of animated images in the simulated environment. The illusion of "being there" (telepresence) is effected by motion sensors that pick up the user's movements to enable adjustment of the view provided the user in real time. Thus, a user can tour a simulated suite of rooms, experiencing changing viewpoints and perspectives that are convincingly related to their own head turnings and steps. The hand-held or mounted controllers 264 typically include buttons and/or triggers 272 by which user actions are relayed to a computing device or system 274 to effect user control of their simulated character and/or to implement user actions with the simulated environment. The hand-held or mounted controllers 264 can be equipped with force-feedback devices that provide the sensation of touch. The hand-held or mounted controllers 264 can be ergonomically formed for comfort and secure grasp in use.

The user can, for example, pick up and manipulate objects that they see in the virtual environment. Visual confirmation of hand-held items and their manipulation can be presented to the user in the simulated environment via a simulated view of the hands, which may appear as character hands 278, such as robot, alien, athlete, soldier or other character hands. Connections 276 in FIG. 2A represent interconnectivity between the sensors and/or other interactive devices with the computing device or system 274 by which calculations and other operation are conducted to dynamically produce the changing simulated environment in which user actions such as hand movements, head movements (looking up, down, left, and right), and user-positioning within a safe environment are typically all represented in the simulated environment. The connections 276 may be wired as represented in FIG. 2A and/or may be or include wireless connections as well. The computing device or system 274 may represent any of the user computing device 104, the mobile device 106, the computing system 206 of the enterprise system 200, and/or the external systems 202 and 204 (FIG. 1). A visual VR session is illustrated in FIG. 2B. Audio information may be provided as well, for example via speakers within or mounted on the visor or helmet 262 or other nearby equipment items. A VR session can be used for gaming, viewing information, navigation, and many other uses.

Augmented reality (AR) refers to the integration of digital information with the user's environment in real time. Unlike virtual reality (VR), which creates a totally artificial environment, AR users experience a real-world environment with computer-generated perceptual information visually combined or overlaid on real world images. The computer-generated simulation of a three-dimensional image or environment can be interacted with in a seemingly real or physical way, typically using a mobile phone such as the user mobile device 106. Because an AR experience does not typically greatly occlude the user's view of their real environment, AR use is potentially more mobile and safer to use outdoors and/or in less controlled environments than VR. However, electronic equipment, such as the visor or helmet 262 (FIG. 2A) and hand-held or mounted controllers 264 may be used as well.

FIG. 3A illustrates an AR session in which a user 302 views a background scene 304 through an AR equipped mobile device 106. FIG. 3B shows the AR image 310 on the mobile device 106. A visual AR session is illustrated. Audio information may be provided as well via speakers of the device 106. The AR image 310 includes characters 311 combined with or overlaid in the background scene 304. Any number of artificial characters and/or objects can be included. An AR session can be used for gaming, viewing information, navigation, and many other uses.

The present invention relates to the user 110 of the system 274 utilizing a three-dimensional representation of data associated with a template provided by the enterprise system 200. The three-dimensional representation of data may then be visualized or interacted with during a VR or AR related activity or session. The enterprise system 200 associated with the system 100 of the present invention may be representative of a financial institution having access to financial data associated with the user 110 utilizing the three-dimensional template. The access to such data may allow the enterprise system 200 to generate the specific three-dimensional representation in reaction to the known data associated with the user 110, or to generate the three-dimensional representation in reaction to a specific request of the user 110. The enterprise system 200 may have access to data associated with the user 110 via the user 110 having an account or other relationship with the enterprise system 200 where such information is readily available for access by the enterprise system 200. For example, the enterprise system 200 may have access to account balances, credit scores, financial obligations, loan terms, past transactions, budgets, or the like associated with the user 110. This data may be retrieved when ascertaining financial characteristics of the user 110, or when attempting to perform financial planning with respect to the user 110. Specific examples of such data and such templates are expanded upon hereinafter.

The three-dimensional representation may refer to a three-dimensional object disposed within a three-dimensional environment such as may be viewed or interacted with during navigation of the three-dimensional environment. The navigation of the three-dimensional environment may be conducted by the user 110 during a virtual reality session executed via the system 274. The three-dimensional representation may otherwise refer to a three-dimensional object displayed relative to the background 304 of an image 310 visible to the user 110 via the system 274 in similar fashion to the AR related example illustrated in FIG. 3B, which shows generated characters 311 overlaid over a background 304. In some circumstances, such an AR experience may utilize what are traditionally referred to as "filters," wherein the resulting three-dimensional representation is shown relative to a face, person, or other similarly detectable object. In any circumstance, the three-dimensional representation is visually perceptible to the user 110 during use of the corresponding system 274, whether within a virtual environment or within an augmented environment.

The system 274, such as the mobile device 106, may have the necessary components for determining the characteristics of a space (environment) relative to the system 274 for properly displaying the corresponding three-dimensional representation at a desired scale relative to the background 304 of the corresponding image 310 when an AR related process is utilized. For example, if a three-dimensional representation of an article of clothing is to be overlaid over an image of the user 110 as determined by the camera of the mobile device 106 acting as the system 274, the related components of the mobile device 106 may be utilized to make the necessary spatial determinations relating to the image generated by the mobile device 106 to maintain a desired scale of the three-dimensional representation of the article of clothing. For example, a vision system associated with a camera of the mobile device 106 may be able to determine the spatial outlay or characteristics of an environment seen by the camera via certain movements of the camera relative to the environment in conjunction with an algorithm corresponding such movements to depths from the vision system. As another example, the mobile device 106 may be equipped with LiDAR, or a similar depth perception system, that is able to ascertain three-dimensional spatial characteristics of the environment via appropriate sensing mechanisms.

In either event, the AR related processes described herein are assumed to include the ability for the three-dimensional representations associated with the templates to be displayed with a desired scale relative to the corresponding background 304 of an image 310 generated via an AR process. This ability to produce a desired scale facilitates the three-dimensional representations being most visually useful to the user 110 in visualizing certain financial concepts or goals, as explained with regards to several examples to follow. It is also assumed that a corresponding virtual three-dimensional environment is configured to display the three-dimensional representation at the proper scale relative to other three-dimensional objects therein to maintain the desired relationship between the three-dimensional representation and the surrounding environment.

Assuming a virtual reality three-dimensional environment is utilized for viewing or interacting with the three-dimensional representation, the enterprise system 200 may itself host the three-dimensional environment such that the user 110 accesses the three-dimensional environment via an application 132 managed by or otherwise associated with the enterprise system 200. That is, the application 132, which may be a mobile banking application or the like, may include a feature wherein the user 110 of the computing system 274 accesses the three-dimensional environment directly via use of the application 132 managed by or associated with the enterprise system 200. For example, where the enterprise system 200 is the financial institution, the application 132 may include the ability for the user 110 to access a three-dimensional environment representative of a specific location where the user 110 can interact with certain interactive elements or other human-controlled characters occupying the three-dimensional environment, which in some circumstances may be representative of agents 210 of the enterprise system 200 responsible for carrying out transactions or offering advice to the user 110. Any three-dimensional environment allowing the described activities to occur with respect to one of the three-dimensional representations may be utilized while remaining within the scope of the present invention.

The three-dimensional environment being managed by or otherwise associated with the enterprise system 200 may facilitate the ability for the enterprise system 200 to access certain data regarding the user 110 navigating the three-dimensional environment when the user 110 interacts with certain templates or representations of data that may be utilized within the three-dimensional environment. For example, as explained in greater detail hereinafter, the template may relate to financial data associated with the user 110 as known by the enterprise system 200. The enterprise system 200 may have access to such personal data due to the user 110 having an account with the enterprise system 200 where the user 110 has provided information or data to the enterprise system 200 or where the enterprise system 200 has ascertained or retrieved such information or data via the interactions occurring between the enterprise system 200 and the user 110. In other words, the application generating the three-dimensional environment does not require external communication with an external server or database associated with a third party such as a one of the described external systems 202, 204, but can instead access data associated with the user 110 via the existing relationship between the user 110 and the enterprise system 200, such as the existence of an account of the user 110 with respect to the enterprise system 200. The application 132 may be configured to access this data, when appropriate, for carrying out the tasks described herein.

In other embodiments, the three-dimensional environment is associated with the user 110 navigating a three-dimensional environment that is generated, monitored, managed, or otherwise administered by one of the external systems 202, 204 other than the enterprise system 200 itself. For example, the user 110 may access the three-dimensional environment via another application 133 executable on the system 274 that is directly associated with the generation of the three-dimensional environment itself, as executed by the corresponding external system 202, 204, as opposed to being focused on providing the products or services offered by the enterprise system 200. The three-dimensional environment may be what is referred to as a "metaverse," wherein multiple users, including users not associated with the enterprise system 200, are able to interact with each other and/or the three-dimensional environment. The application 133 may offer a feature where the user 110 can access the three-dimensional environment for further interacting with one of the described three-dimensional representations, such as visualizing the three-dimensional representation relative to the surrounding three-dimensional environment. The user 110 is then able to import or otherwise access the template and/or three-dimensional representation of the template associated with the enterprise system 200 during navigation of the three-dimensional environment via use of the application 133.

For example, the application 133 may include a three-dimensional environment wherein users or certain third parties can introduce or otherwise utilize three-dimensional content such as the described three-dimensional representation. The application 132 associated with the enterprise system 200 and the application 133 associated with the navigation of the three-dimensional environment may be compatible with each other or may otherwise be configured to allow for the introduction and use of the three-dimensional representation associated with the enterprise system 200 within the three-dimensional environment hosted by the third party application 133. The different applications 132, 133, which may each be contemporaneously executed on the same system 274 during the navigation of a three-dimensional environment, and may be configured to communicate with each other via the appropriate communication methods established therebetween with reference to the description of the system 100 hereinabove. That is, any data necessary for generating the three-dimensional representation via the application 133 may be acquired via appropriate communication between the enterprise system 200 and the corresponding external system 202, 204, such as may be facilitated by corresponding instructions associated with one or both of the applications 132, 133 for querying and/or sending the necessary data between the enterprise system 200, the external system 202, 204, and the system 274 utilized by the user 110. In some embodiments, the enterprise system 200 and the third-party external system 202, 204 may have an express agreement or the like wherein the external system 202, 204 can query the enterprise system 200 for the necessary data according to certain permissions or credentials supplied by the user 110 for allowing such communications.

In some embodiments, the template and/or the resulting three-dimensional representation may be associated with a distributed digital ledger (blockchain) wherein certain data associated with the template and/or the resulting three-dimensional representation may be stored to the distributed digital ledger for reference when the user 110 accesses a three-dimensional environment. Such an arrangement may be utilized when it is desirable to import the resulting three-dimensional representation into multiple different three-dimensional environments or to utilize the three-dimensional representation with respect to multiple different applications 132, 133 that may be associated with the system 274. Such an approach may also be utilized when the resulting three-dimensional representation is unique in character, and therefore may benefit from a distributed method of identification or authentication that can be utilized across different applications 132, 133. The use of the distributed ledger may allow for the access to each unique three-dimensional representation (which may be associated with a specific block of the blockchain) with respect to any number of different three-dimensional environments that are compatible with generating the three-dimensional representation based on the data stored to the distributed ledger. Any subsequent events occurring with respect to the three-dimensional representation, such as any changes made thereto, may also be tracked by such a system for real-time updating of the three-dimensional representation or any tracked interactions therewith.

The system 274 and the applications 132, 133 executed thereon may be configured wherein the data associated with the navigation of the three-dimensional environment via one application 133 is able to be monitored and reacted to by the application 132 associated with the enterprise system 200 to allow for real-time interventions and interactions between the user 110 and the enterprise system 200. The application 132 associated with the enterprise system 200 may monitor the data transferred to and from the system 274 utilized by the user 110 during navigation of the three-dimensional environment to allow for the enterprise system 200 to intervene at an appropriate instance. For example, the application 132 associated with the enterprise system 200 may be configured to monitor certain data received by the system 274 during navigation of the three-dimensional environment that is associated with the ability of the user 110 to access a corresponding three-dimensional representation of data associated with one of the three-dimensional templates. Upon determining that such data has been received or accessed by the user 110, the application 132 associated with the enterprise system 200 may be configured to access certain data associated with the user 110 for carrying out the processes and methods disclosed herein, such as by communicating externally with a database associated with the enterprise system 200. Such a database may be represented by the storage device 224 of system 100, which may include any of the earlier described account and/or financial information relating to the user 110.

If an AR related process is utilized in interacting with the three-dimensional representation, the third-party application 133 may be associated with a social media application having certain AR related functions in accordance with those described herein. For example, the social media application 133 may be configured to allow a user 110 to create a video file or streaming content that is viewable by other social media users wherein the image contained within the video includes the three-dimensional representation therein, such as being shown as a three-dimensional object overlaying the background 304 of the image 310 of FIG. 3B. The social media application 133 and the application 132 associated with the enterprise system 200 may accordingly communicate with each other or have any of the described relationships contemplated above with regards to the communications or relationships described with respect to the virtual reality-based use of a three-dimensional environment. For example, the social media application 133 may include the ability to import third-party produced three-dimensional content corresponding to the described three-dimensional representation (or template) to allow for the user 110 to access such features via use of the social media application 133, although certain data associated with the generation of the template and/or the resulting three-dimensional representation may be derived from use of the application 132 and/or a querying of the enterprise system 200.

In some circumstances, the application 132 may include a feature for conducting the described AR related functions directly and in the absence of the need of a third-party application 133 (such as the described example of a social media application 133 having a selection of "filters" or the like). For example, where the enterprise system 200 represents a financial institution such as a bank, the mobile banking application 132 provided by the enterprise system 200 for use by a user 110 having an account therewith may itself provide certain features for visualizing the three-dimensional representations described herein. Such an example may include the system 274 being the mobile device 106 with access to a camera thereof, wherein the application 132 may have access to the functions of the camera for generating the necessary AR related content as displayed within an image such as the exemplary image 310 of FIG. 3B.

In any circumstance, the template and resulting three-dimensional representation are utilized by the user 110 to visualize certain financial information in a manner that cannot be recreated via traditional two-dimensional interfaces or representations of data, and especially when such three-dimensional representations are presented at a desired scale for showing a desired relationship. Each of the described templates may be considered a form of program or instruction set that, when executed, results in the generation of a specific three-dimensional representation based on data that is either 1) associated with the user 110 via an account with the enterprise system 200, or 2) data that is entered by the user 110 upon receiving an appropriate prompt. Each template may be directly related to the generation of a certain three-dimensional object, a certain three-dimensional representation of a selected set of data, or the like. In other words, each template corresponds to the generation of a specific classification or type of three-dimensional representation, and each three-dimensional representation may itself be further modified via the input of certain data utilized in determining the configuration of the generated three-dimensional representation. The data associated with the template may be associated with determining variable characteristics of the three-dimensional representation in accordance with the instructions associated with the template.

Each three-dimensional representation may have any desired shape, position, orientation, and dimensions relative to the virtual or actual environment, including being positioned and oriented relative to any other three-dimensional object or actual object within the corresponding virtual or actual environment. The three-dimensional representation may be a static and unchanging three-dimensional object or may be associated with some form of movement or animation. As one example, a three-dimensional representation of an animal may include animated body movements rather than being a fixed three-dimensional shape. As another example, the three-dimensional representation may constantly change in appearance as text is progressively written out or highlighted with respect to the three-dimensional representation of a written statement, such as a graphic relating to written advice. As another example, the three-dimensional representation may relate to a graph or chart where showing a change in a characteristic over time can be shown easily via a growing or changing portion of the three-dimensional representation of the graph or chart. As yet another example, the three-dimensional representation may include a two-dimensional element corresponding to a screen or the like on which a video file or animation is played, wherein the two-dimensional element may be repositioned or reoriented within the three-dimensional environment.

The described relationships are best understood by means of the following examples. In all examples, it is assumed that the user 110 has been prompted or otherwise given the opportunity to access one of the templates for creating one of the three-dimensional representations. This may result following substantially any process via navigation of substantially any corresponding application 132, 133. As one non-limiting example, the user 110 may utilize a social media application 133 having an AR related function where one or more of the described examples of templates can be selected for use in forming an image, video, or streaming session having AR content, such as a representation corresponding to a "filter" overlaying some aspect of the image.

The selection of the template itself may relate to the selection of a certain type or classification of data to be represented. Once this general classification is selected, the process of selecting the template may further include the user 110 entering certain data related to a request of the user 110 or the user 110 agreeing to the template accessing data associated with the user 110 as known by the relationship present between the user 110 and the enterprise system 200, such as the existence of account information stored to the storage device 224 of the enterprise system 200. In some circumstances, the selection of the template itself may prompt the automatic input of the necessary data via the necessary communications with the enterprise system 200 for retrieving data specific to the user 110, if agreed to ahead of time by the user 110. The template may accordingly be a category of a type of three-dimensional representation and the additional data associated with configuring the three-dimensional representation may be utilized in narrowing the broad category to a specific three-dimensional configuration and appearance, as viewed via a VR or AR experience.

According to a first example, the template relates to the generation of a three-dimensional representation of an object having a specific monetary value, including the generation of a three-dimensional representation of an amount of a specified currency. The template itself may include instructions for the generation of a three-dimensional model of such currency as may be utilized in a corresponding AR or VR session, including graphical data for recreating the appearance of the currency (such as utilizing specified shapes and texture maps). The data input by the user 110 and/or associated with the personal data of the user 110 for modifying the described category of template may be an amount of the specified currency for determining characteristics of the three-dimensional representation, such as the size of the three-dimensional representation of the currency relative to the surrounding three-dimensional environment or actual environment (when performing an AR session). The three-dimensional representation may be modified by entering or referencing different data corresponding to the three-dimensional representation having different characteristics, such as entering a different form of currency, entering a different bill or coin of the selected amount of currency for representation, entering a different value amount of the currency, or referencing a different numerical value associated with the user 110 for influencing the generation of the three-dimensional representation.

FIG. 4 illustrates the above example with reference to an environment 401 having a three-dimensional representation 402 of the currency-based template shown as a stack of cash of a specific size (three bound stacks corresponding to a specific monetary value in the present example) relative to the environment 401. The environment 401 may represent a three-dimensional environment generated for a VR session in a fashion corresponding to the example illustrated in FIG. 2B, wherein the representation 402 is able to be positioned and oriented within the generated three-dimensional environment 401 for viewing or other interaction therewith by the user 110 or another user navigating the same three-dimensional environment 401. The representation 402 may be reproduced at a scale corresponding to the real scale of the corresponding currency relative to the remainder of the environment 401 to maintain the ability of the user 110 to ascertain the scale of the representation 402 if perceived in a real-world environment (as opposed to virtually).

The environment 401 may alternatively represent an actual real-world three-dimensional environment relative to which the representation 402 may be visualized via an appropriate AR session or process. The illustrated corner may be representative of a corner of an actual room viewable via a camera of the system 274 with the representation 402 overlaying the image of the actual environment as viewable via a display or the like of the system 274. In such a circumstance, the representation 402 is configured to have a desired scale relative to the environment 401 to promote the ability of the user 110 to accurately visualize the content of the representation 402. In the given example, such a scale would include the dimensions of the representation 402 corresponding to those of the object being mimicked by the representation 402, such as each of the stacks of the money of the representation 402 having a height, width, and length of such a stack of actual money of the selected currency, bill, number of bills, etc.

As mentioned above, characteristics of the representation 402, such as the size of the representation 402 directly corresponding to a numerical monetary value, may be selected by the user 110 during the selection of the template for use within the corresponding VR/AR activity. In other circumstances, some or all of the variable characteristics of the template may be determined by reference to the data associated with the user 110 as known by the enterprise system 200. For example, the user 110 may select a template that indicates that the template will create a representation of the actual dollar amount present within a specified account of the user 110, such as a bank account balance or investment account balance. The selection of the template may automatically prompt the retrieval of the necessary data associated with the user 110 to formulate the representation 402 in accordance with the personal data of the user 110.

The user 110 is then able to visualize the representation 402 of the value of the selected account, thereby giving the user 110 a different context with which to consider financial information, including the state of the user's 110 own finances. Specifically, the ability to visualize content three-dimensionally and in an atypical manner may aid some users 110 in better conceptualizing certain financial concepts, including having a visual concept of a comparison between different values. For example, it may be difficult for some users 110 to readily conceive how two numbers relate to one another absent such a visualization showing the relative spatial dimensions therebetween. Additionally, the ability to visualize such content often provides a different mental impression within the user 110 that may allow the user 110 to better visualize certain goals or the like, thereby providing motivation and/or discipline for the user 110 to pursue certain actions for achieving such a goal. For example, the ability of the user 110 to focus on a specific size of the stack of cash, as opposed to a pure numeric value as normally read via text, may aid in motivating certain users 110 in comparison to traditional, purely numerical reporting methods.

The example of FIG. 4 may be expanded to additional situations and contexts to provide greater functionality to the user 110 in conducting financial planning or in conducting financial decisions. One such example is shown in FIG. 5 with regards to a representation 502 of a trend occurring with respect to certain data, wherein the representation 502 is shown relative to the environment 401 representative of the virtual environment or the real-world environment. The example shown includes the user 110 selecting a template that corresponds to a change in value over time, such as may be associated with a certain rate of return being expected with respect to a specific investment, wherein such a change in value is shown three-dimensionally in some form. In the present example, the representation 502 includes the generation of multiple different stacks of cash, with each of the stacks of cash corresponding to a value after a given period of time. The example shown includes the value of the investment in question doubling from year 1 to year 2, and again from year 2 to year 3. The example of FIG. 5 accordingly illustrates a situation wherein exponential growth can better be visualized by the user 110 by showing how such growth relates to actual three-dimensional objects.

The same concept shown in FIG. 5 may also be appreciated by utilizing an animated three-dimensional representation as mentioned hereinabove. The size of the stack of cash from Year 1 to Year 3 could instead be shown via an appropriate animation where the appearance of the stack of cash from Year 1 is slowly added to increase the height of the stack, such as adding an appropriate number of dollars by unit time to correspond to the rate in change specified, while the time indication below changes, thereby resulting in an animation showing the same information as the progression of FIG. 5. The use of such an animation may once again provide a different mental impression than does a more traditional chart or graph, or even the example of FIG. 5.

The stacks of cash shown in FIGS. 4 and 5 are merely one example of the possible three-dimensional objects or graphics that may be generated via the use of a template such as that described above. Such a template is not limited to the three-dimensional representation of currency, but additionally or alternatively may be utilized in visualizing substantially anything of value that may be utilized by the user 110. As one example, the template may include the selection of a desired precious metal such as gold, and the three-dimensional representation may correspond to a three-dimensional volume of the precious metal that would be required to meet a specific numeric monetary value. In another example, the user 110 selects a consumer good having a known price and a certain three-dimensional appearance, such as a food item. The representation may include an arrangement of a number of the food items corresponding to a monetary value selected by the user 110. In other words, the user 110 may, for example, choose a template that visualizes the three-dimensional space occupied by a given number of apples, with each representation of a full apple corresponding to a set monetary value. The resulting representation can provide the user 110 the ability to visualize the size occupied by a purchase being contemplated, or to otherwise visualize how much of a certain good corresponds to a certain value. Such a feature may be useful in estimating costs based on spatial considerations, or spatial considerations based on cost, as circumstances may warrant.

FIG. 6 illustrates another example of a representation 602 that may be utilized by the user 110. The representation 602 is a pie chart showing the division of the budget of the user 110 into three different slices, with one of the slices axially offset from the remaining two. The representation 602 is again shown relative to the environment 401. The disclosed example illustrates the ability of the three-dimensional representation 602 to utilize three-dimensions in a manner that once again may promote a different mental impression in the mind of the user 110, thereby altering the way in which the user 110 approaches certain financial situations or considerations. The disclosed budget may be associated with data known by the enterprise system 200, such as past transactions of the user 110 that have been utilized in estimating the budget. The budget may alternatively be set up by the user 110 as a feature of the application 132.

Another example, not pictured, includes the generation of a three-dimensional representation related to the communication of an assessment of the user 110, wherein such an assessment may be utilized to generate advice to the user 110. For example, the corresponding template may be categorized as giving financial advice to the user 110 based on the data known to the enterprise system 200, such as advice for better utilizing a credit card offered by the enterprise system 200. The enterprise system 200 may perform an appropriate analysis of the data associated with the user 110 to determine such advice based on an assessment of the user 110, such as informing the user 110 that more credit card rewards could be attained by switching the user 110 to a different rewards package more closely aligned to the past purchases of the user 110 as monitored by the enterprise system 200. As another example, the representation may include data regarding a distribution of the user's 110 income to various expenses, with a recommendation on a suggested change in the distribution to encourage increased savings by the user 110.

Each of the three-dimensional representations described herein may further be associated with a graphic representation of a trademark or other identifier of the enterprise system 200 to allow for promotion of the enterprise system 200, such as when the corresponding three-dimensional representation is displayed in a corresponding virtual environment or when the three-dimensional representation is visible in a social media post having AR related content. The promotion may include any advice or other helpful content being associated with the enterprise system 200, such as indicating that the recommendation associated with such advice has been determined by the enterprise system 200. Each representation may also be associated with any information necessary to redirect a user 110 following interaction therewith, such as redirecting the user 110 to a website associated with the enterprise system 200.

Referring now to FIG. 7, a flow chart 1000 summarizes a method of generating a three-dimensional representation of financial data according to the present invention. The method may include an initial step, not shown, of establishing a relationship between the user 110 and the enterprise system 200 as described herein, such as establishing some form of financial account of the user 110 with the enterprise system 200 for providing the enterprise system 200 to the types and forms of data contemplated herein. This initial and optional step may also relate to the user 110 providing login credentials or the like for establishing the authenticity of the user 110 when accessing the corresponding account information via the enterprise system 200. The method disclosed herein may, in some examples, include the user 110 logging into the application 132 associated with the enterprise system 200 for establishing the necessary authentication of the user 110 for generating a three-dimensional representation based on the data of the user 110.

The illustrated method includes a step 1001 wherein the enterprise system 200 creates a template corresponding to one of the three-dimensional representations. The template includes the necessary instructions for generating the corresponding three-dimensional representation once all necessary data has been received for determining all characteristics of the resulting three-dimensional representation. The method then includes a step 1002 of providing the template for selection by the user 110. The step 1002 may include the template being hosted for selection by the user 110 via any of the described applications 132, 133 and via any of the described sources 200, 202, 204.

The selection of the template may then be followed by a step 1003 of accessing characteristic data utilized in determining at least one characteristic of the resulting three-dimensional representation, as determined by the programming of the corresponding template. The accessing of the characteristic data may include the user 110 being prompted for an entry of data, such as giving a text or numeric response to a query, or may include the enterprise system 200 accessing personal data known to the enterprise system 200 about the user 110 via an existing relationship therebetween, such as by reference to the storage device 224 for access to financial accounts regarding the user 110. Where personal financial information may be included for presentation in such a three-dimensional representation, the accessing of the characteristic data may further include the enterprise system 200 requesting the permission of the user 110 for access to the data to be displayed, thereby preventing undesired access to certain financial information regarding the user 110. The accessing of characteristic data may include a combination of the user 110 being prompted for a selection or an entry of data followed by the enterprise system 200 accessing certain personal data regarding the user 110 in response to the selection or entry of the user 110. In some circumstances, the computing system 206 of the enterprise system 200 may execute an algorithm corresponding to the analysis of the accessed characteristic data for determining the content to be utilized in the forming of the three-dimensional representation.

The method then includes a step 1004 of generating the corresponding three-dimensional representation. In certain circumstances, the three-dimensional representation may be unique to the user 110 on the basis of data unique to the user 110 being utilized in the generation thereof. The method then includes a step 1005 of displaying the three-dimensional representation relative to a three-dimensional environment, which may refer to a virtual three-dimensional environment or an actual real-world three-dimensional environment. The step 1005 may accordingly refer to the use of the three-dimensional representation in either of a VR or an AR related process, as the situation warrants.

The disclosed method benefits the user 110 in various respects in addition to the described effect of presenting financial data in a new and different manner. As one additional benefit, several of the contemplated representations may offer a certain entertainment value when utilized by the user 110 relative to the corresponding environment, such as utilizing representations of objects of value of interest to the user 110. Another benefit may include the social media engagement that may be derived from certain information presented by one of the three-dimensional representations. For example, a social media influencer hoping to provide financial advice may utilize certain three-dimensional representations contemplated herein to illustrate certain concepts, or to prompt engagement from others on opinions regarding the data communicated.

The disclosed method also benefits the enterprise system 200 for various reasons identified herein, including the ability to better educate those users 110 having a relationship with the enterprise system 200. The enterprise system 200 can also increase exposure via the use of branding or other identifiers relative to such three-dimensional representations. This can potentially prompt additional users to seek out and access the described template on a corresponding application 132, 133 for pursuing additional social media engagement. The use of three-dimensional representations that specifically offer advice or an assessment of the user 110 can also lead to other users having a positive impression of the enterprise system 200 via the availability of such services.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. An augmented reality system comprising:
at least one processor;
a communication interface communicatively coupled to the at least one processor; and
a memory device storing executable code that, when executed, causes the processor to: provide a template for selection by a user, the template corresponding to a program for generating a three-dimensional representation for display relative to a corresponding real-world three-dimensional environment;
access a monetary value associated with the user;
generate the three-dimensional representation, wherein the three-dimensional representation has an appearance of at least one real-world object, wherein each respective real-world objects represented by the three-dimensional representation is associated with each of a corresponding real-world monetary value and a corresponding real-world size, wherein a combined monetary value of the three-dimensional representation is determined by combining the real-world monetary values of all of the respective real-world objects represented by the three-dimensional representation, wherein each of the respective real-world objects represented by the three-dimensional representation is a form of money or a consumer good; and
display the three-dimensional representation relative to the corresponding real-world three-dimensional environment, wherein the combined monetary value of the three-dimensional representation is equal to the accessed monetary value associated with the user, and wherein each of the respective real-world objects represented by the three-dimensional representation is displayed relative to the corresponding real-world three-dimensional environment at a scale corresponding to each of the respective real-world objects represented by the three-dimensional representation having the appearance of the real-world size of each respective real-world object relative to the real-world three-dimensional environment.

2. The system of claim 1, wherein the accessing of the monetary value includes prompting the user for an entry of the monetary value.

3. The system of claim 1, wherein the at least one real-world object represented by the three-dimensional representation is determined based on the selection of the template by the user.

4. The system of claim 3, wherein the three-dimensional representation has the appearance of one or more forms of currency having the monetary value corresponding to the monetary amount.

5. The system of claim 1, wherein the accessing of the monetary value associated with the user includes accessing personal data of the user.

6. The system of claim 5, wherein the personal data of the user is financial data.

7. The system of claim 5, wherein the monetary amount associated with the user corresponds to an account balance of the user.

8. The system of claim 1, wherein the monetary value associated with the user is one of selected by the user or based on personal data of the user.

9. The system of claim 1, wherein the three-dimensional representation relates to financial content.

10. The system of claim 9, wherein the three-dimensional representation relates to one of financial advice or financial assessment.

11. The system of claim 10, wherein the monetary value associated with the user is derived from financial data associated with the user.

12. The system of claim 1, wherein the appearance of the three-dimensional representation is personalized to the user based on the monetary value associated with the user.

13. The system of claim 12, wherein the monetary value associated with the user is derived from personal data of the user stored to the memory device of the system.

14. A method of operating an augmented reality system comprising the steps of:
providing a template for selection by a user, the template corresponding to a program for generating a three-dimensional representation for display relative to a corresponding real-world three-dimensional environment;
accessing a monetary value associated with the user;
generating the three-dimensional representation, wherein the three-dimensional representation has an appearance of at least one real-world object, wherein each respective real-world objects represented by the three-dimensional representation is associated with each of a corresponding real-world monetary value and a corresponding real-world size, wherein a combined monetary value of the three-dimensional representation is determined by combining the real-world monetary values of all of the respective real-world objects represented by the three-dimensional representation, wherein each of the respective real-world objects represented by the three-dimensional representation is a form of money or a consumer good; and
displaying the three-dimensional representation relative to the corresponding real-world three-dimensional environment, wherein the combined monetary value of the three-dimensional representation is equal to the accessed monetary value associated with the user, and wherein each of the respective real-world objects represented by the three-dimensional representation is displayed relative to the corresponding real-world three-dimensional environment at a scale corresponding to each of the respective real-world objects represented by the three-dimensional representation having the appearance of the real-world size of each respective real-world object relative to the real-world three-dimensional environment.

* * * * *